US006403974B1

United States Patent
Lin

(10) Patent No.: US 6,403,974 B1
(45) Date of Patent: Jun. 11, 2002

(54) TEST DEVICE FOR HORIZONTAL POSITION OF AN OPTICAL DISC DRIVE MOTOR

(75) Inventor: Bo-Wen Lin, Taoyuan (TW)

(73) Assignee: Behavior Tech Computer Corporation, Taipei (TW)

( * ) Notice: Subject to any disclaimer, the term of this patent is extended or adjusted under 35 U.S.C. 154(b) by 25 days.

(21) Appl. No.: 09/709,357

(22) Filed: Nov. 13, 2000

(51) Int. Cl.$^7$ ............................................. G01B 11/26
(52) U.S. Cl. ..................................... 250/559.3; 356/612
(58) Field of Search ............................ 250/548, 559.3, 250/559.33; 356/612

(56) References Cited

U.S. PATENT DOCUMENTS 5,631,738 A * 5/1997 Childers ..................... 356/375
5,696,383 A * 12/1997 Cheng ...................... 250/559.22
6,043,892 A * 3/2000 Park .......................... 356/400

* cited by examiner

*Primary Examiner*—Robert H. Kim
*Assistant Examiner*—Allen C. Ho
(74) *Attorney, Agent, or Firm*—Rosenberg, Klein, & Lee

(57) ABSTRACT

A test device for horizontal position of an optical disc drive, comprising a test platform having a plurality of vertical position rods mounted thereon and the rods being of similar horizontal height; and at least a sensor mounted within the area formed by the position rods located on the platform, and including at least an emitting element and a receiving element, the emitting element emitting an optical detection signal (i.e., incident wave) to an optical disc connectedly driven by the motor rotating shaft of a pick-up mechanism to be tested, by means of a reflected optical signal produced by the optical disc, the receiving element receives the signal, and the sensor produces a horizontal height measuring data, and thereby the results and the measured horizontal height data determine whether the motor horizontal position of the optical disc drive pick-up device is parallel to the horizontal axial direction of the optical disc drive pick-up device.

5 Claims, 4 Drawing Sheets

TEST DEVICE FOR HORIZONTAL POSITION OF AN OPTICAL DISC DRIVE MOTOR

BACKGROUND OF THE INVENTION (a) Technical Field of the Invention

The present invention relates to a test device for horizontal position of an optical disc drive motor, and in particular, a test device to test the quality of installation of the horizontal axle of a motor of an optical disc driven pick-up mechanism.

(b) Description of the Prior Art

Optical disc drive is widely used in audio-video devices and equipment, and computer systems as a prime device in picking-up computer data or audio-video data. However, in this pick-up device of the optical drive device, the motor for driving the optical disc to rotate plays a very significant position. Besides, other than being used to drive the rotation of the optical disc so as to facilitate the optical pick-up, it is necessary that the horizontal shaft of the pick-up mechanism should maintain to rotate horizontally so that the optical element will not pick-up errors. In other words, when the motor is mounted to the pick-up mechanism, it cannot be tilted or biased from the horizontal axis of the pick-up mechanism.

Conventionally, the quality of horizontal mounting of the motor of the pick-up mechanism is determined by eye inspection method, or after the entire optical drive is mounted, an optical disc pick-up data test is employed to determine the horizontal mounting of the motor. However, the eye inspection method can cause tiredness to the inspector, and the time taken, man-power and capital involved will increase. In addition, vision error or error determination caused by vision inspection may cause the quality of horizontal mounting of motor being poor. Moreover, by means of pick-up test on data following the entire optical disc drive being mounted is time consuming and laborious, and the factors cause errors by the optical disc drive are numerous. Probably it may not solely due to the horizontal mounting of the motor, and the inspector at the production line may not be able to solve the errors. Even the factor caused by the horizontal mounting has been identified, the entire optical disc drive has to be dissembled so as to re-assemble the motor. Thus, the testing, and repairing of the optical disc drive at the production line are troublesome, and the cost of production will increase.

Accordingly, it is an object of the present invention to provide a test device for horizontal position of an optical disc drive motor which will mitigate the above drawbacks.

SUMMARY OF THE INVENTION

Accordingly, it is an object of the present invention to provide a test device for horizontal position of an optical disc drive motor, wherein a sensor is used to inspect the quality of horizontal mounting of the motor by means of a precise optical height measuring method so that the time taken, man-power and capital for testing are greatly reduced and the test results are reliable.

Yet another object of the present invention is to provide a test device for horizontal position of an optical disc drive motor, wherein the test process can be carried out before the entire mounting of the optical disc drive to avoid troublesome and difficulty of subsequent inspection and maintenance.

A further object of the present invention is to provide a test device for horizontal position of an optical disc drive motor, wherein an interfacing device is used and to transmit the horizontal test results and data of the motor to a near-end computer or a far-end computer for reading and recording, the best results being recorded immediately and used for subsequent inspection and maintenance.

Other object and advantages of the present invention will become more apparent from the following description taken in conjunction with the accompanying drawing.

DETAILED DESCRIPTION OF THE PREFERRED EMBODIMENT

Figure 1:
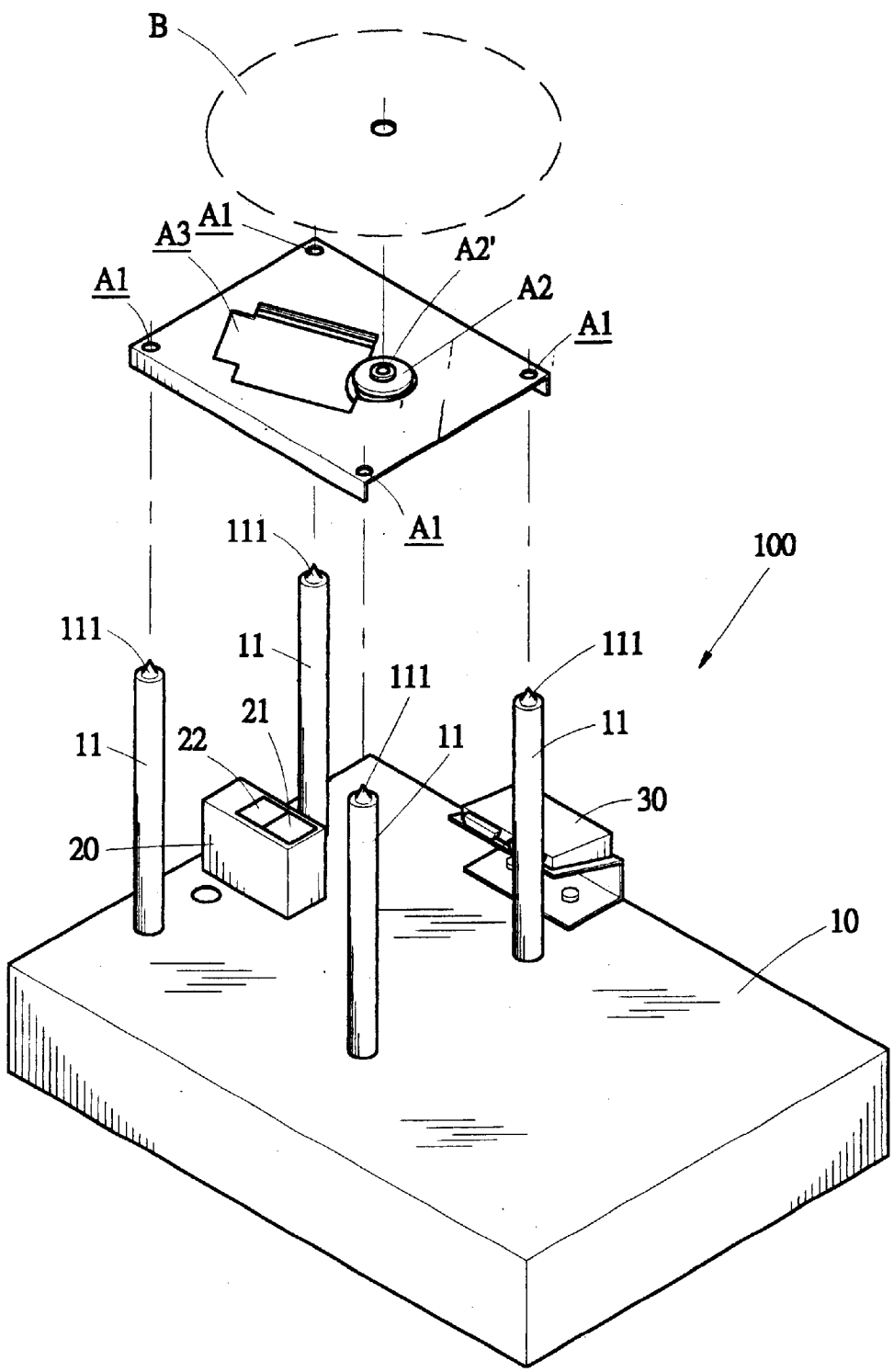
FIG. 1 is a perspective structure view of the present invention.

Referring to FIG. 1, there is shown a perspective view of a test device for horizontal position of an optical disc drive motor, in accordance with the present invention (hereinafter referred to test device and denoted by numeral 100). The test device 100 comprises (a) at least a sensor 20, and (b) a test platform 10 having mounted vertically with a plurality of position rods 11, and the end terminal of the position rod 11 being a protruded block 111, and the individual height of the positioning rods 11 being at the same horizontal height. The protruded block 111 at the top portion of the position rod 11 is adapted for the mounting of a mounting hole A1 located at the four corners of a pick-up device A of a test optical disc drive. That is, the horizontal axis of the pick-up device A and the horizontal face formed by the position rods 11 and the test platform 10 are kept at horizontally parallel. The rotating shaft A2' of motor A2 of the pick-up device A is first mounted with an optical disc B', and by means of the rotation of the disc B, the condition of horizontal mounting of the motor A2 can be reflected.

In accordance with the present invention, the sensor 20 is mounted at the area formed by the plurality of the position rods 11, and comprises at least an emitting element 21 and a receiving element 22. The emitting element 21 can emit upward optical detection signals and their reflected signals are received by the receiving element 22. The sensor 20 possesses the function of fixed point height-measuring at a particular height. The sensor 20 comprises a laser optical signal-sensing element or infrared signal-sensing element. That is, the optical detection signals of the emitting element 21 passed through a pick-up track port A3 of the pick-up device A are emitted onto the optical disc B, and are reflected by the optical disc B as reflected optical signals received by the pick-up element 22, to determine whether the optical disc B is parallel to the horizontal plane formed by the horizontal axial pick-up mechanism A and the individual position rod 11, and the test platform 10. Thus, the quality of horizontal mounting of motor A2 can be predicted.

In accordance with the present invention, the test device 100 further comprises an interfacing device 30 mounted at an appropriate position on the test platform 10. The interfacing device 30 has the function of data conversion and communication, and transmission so as to detect data, and the results by the sensor 20 are transmitted to the near-end computer C (refer to FIGS. 3 and 4) or the far-end computer (not shown) for reading and recording.

Figure 2:
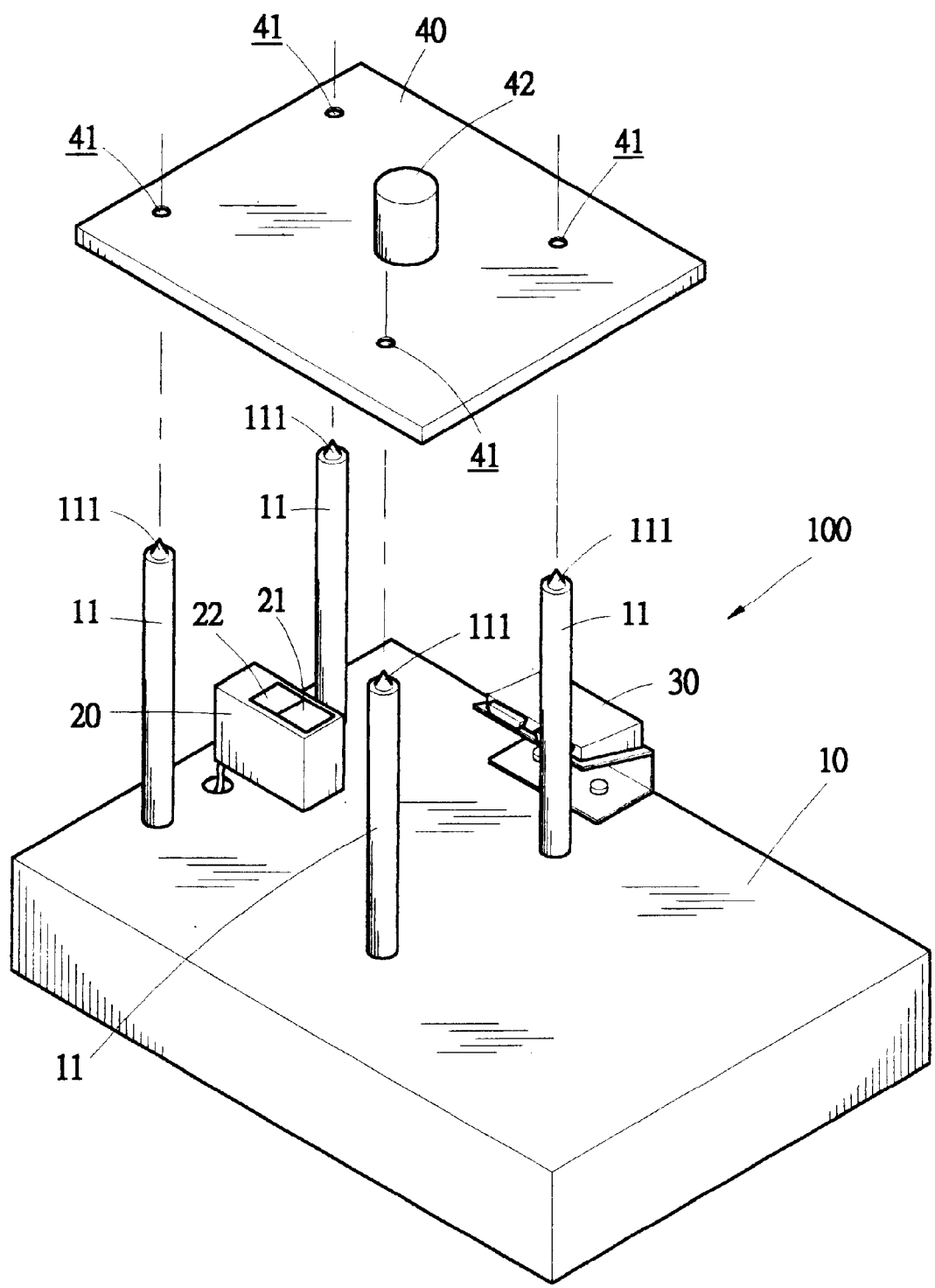
FIG. 2 is a perspective view similar to FIG. 1, showing reference calibration of the position rod and the sensor of the test device of the present invention.

Referring to FIG. 2, there is shown the reference calibration of the test device 100. That is, a reference board 40 is located on the position rods 11 to proceed with the calibration. The reference board 40 is a horizontal surface which can reflect light. That is, the horizontal plane formed by the horizontal axial direction of the pick-device A with the position rods 11 and the test platform 10 are parallel surface. The four corners of the board 40 are provided with holes 41 for the mounting of the protruded block 111 of the position rods 11. The top face of the board 40 is provided with a lifting section 42 for holding and placing of the reference board 40.

FIG. 2 shows the reference calibration operation of the test device 100. The reference board 40 is secured onto the position rod 11. The emitting element 21 of the sensor 20 emits an optical detection signal to a certain point at the bottom surface of the reference point at the bottom surface of the reference board 40. By means of the reference board 40, reflected optical signals are produced such that the receiving element 22 of the sensor 20 receives these signals to cause the sensor 20 to generate horizontal height measuring signals to the near-end computer C or the far-end computer for comparing with the standard horizontal height data. Thus, the horizontal reference of the position rods 11 and the test platform 10 are calibrated so that the sensor 20 for sensing the horizontal mounting quality of motor A2 of the pick-up device A is accurate.

Figure 3:
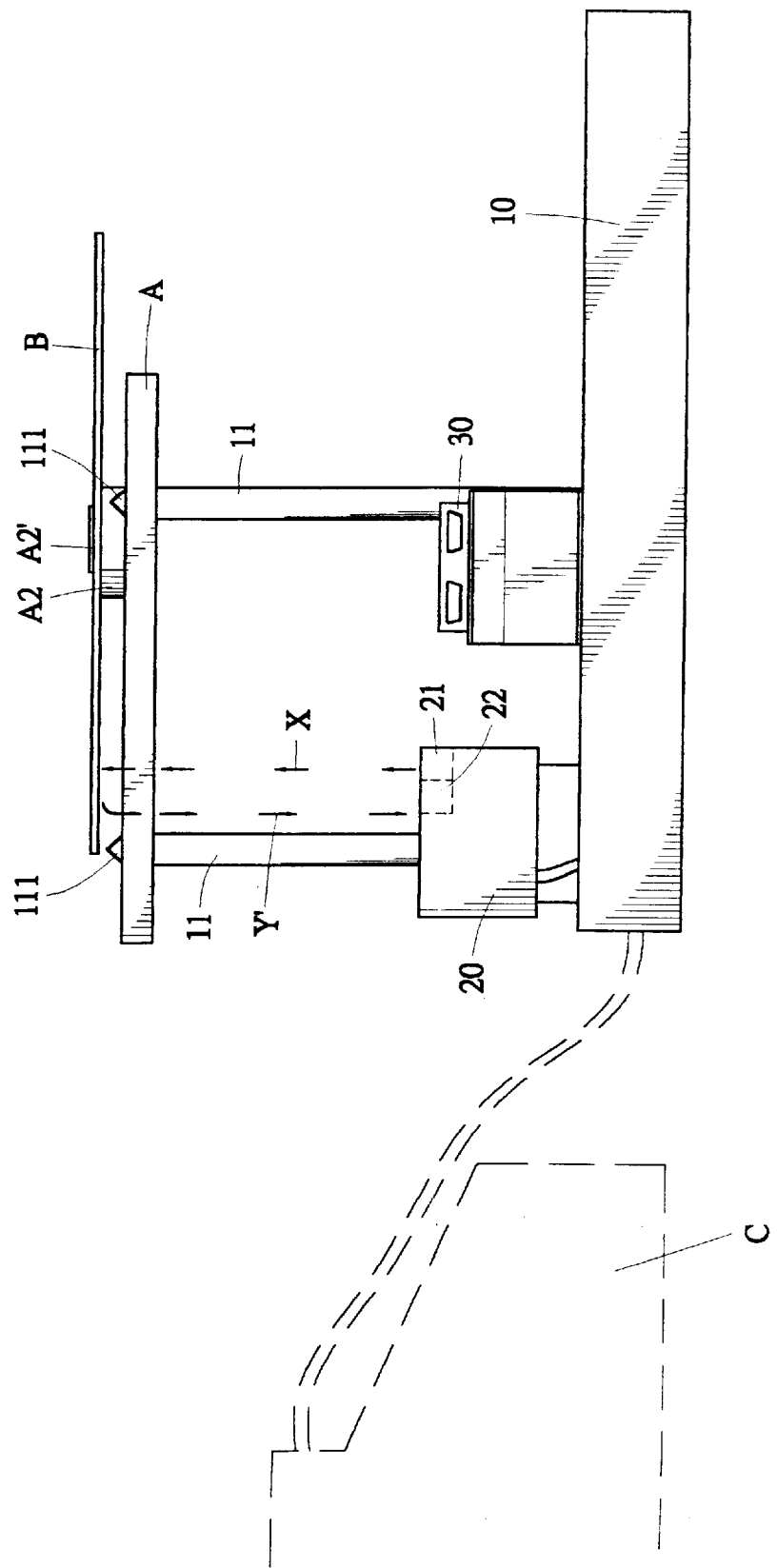
FIG. 3 is a side elevation view showing the interfacing device connected to a near-end computer to test the quality of horizontal mounting of the motor in accordance with the present invention.

Referring to FIG. 3, there is shown the quality of horizontal mounting of motor A2 of the optical disc drive pick-up device A being tested by the test device 100 of FIG. 1. That is, after the reference calibration of FIG. 2, the pick-up device A is secured by the position rods 11. On the rotating shaft A2 of the motor A2, an optical disc B is mounted, and the motor A2 is switched ON to drive the optical disc B. At this instance, the emitting element 21 of the sensor 20 emits an optical detection signal (as shown in FIG. 3). That is, an incident wave X is emitted to the surface of the rotating optical disc B, and the optical disc B produces a reflected optical signal, i.e., a reflected wave Y, which is received by the receiving element 22 of the sensor 20.

As shown in FIG. 3, if the mounting position of the motor A2 is parallel to the plane formed by the horizontal axis of the pick-up device A and the individual position rods 11, and the test platform 10, then, it indicates that the optical disc B, in the process of rotating, is also parallel to the plane formed by the horizontal axis of the pick-up device A and the individual position rods 11, and the test platform 10, and the reflected wave Y which received anytime by the receiving element 22 of the sensor indicates identical detected height data.

That is, the measured height represented by the reflected wave Y is constant. This indicates that the quality of horizontal mounting of motor A2 is good and is a passed product. By means of the interfacing device 30, the tested results are transmitted to the near-end computer C at the local site or a far-end computer for determination and recording.

Figure 4:
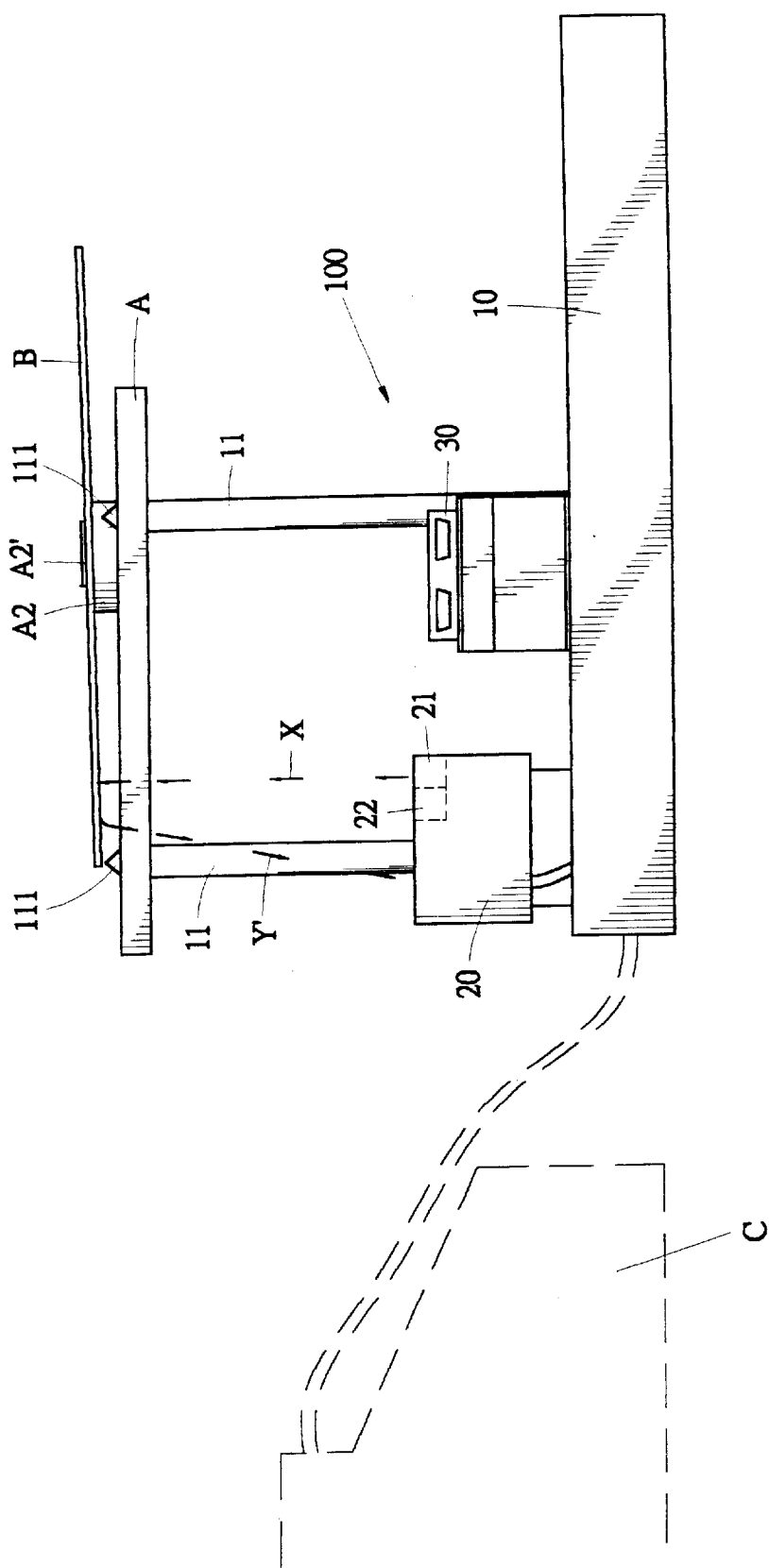
FIG. 4 is a side elevation view similar to FIG. 3, showing the inspection of the horizontal axle of the pickup mechanism being non-horizontal.

Referring to FIG. 4, there is shown the quality of mounting of the motor A2 of the test device 100 of FIG. 3 being failed. When the motor A2 is tilted and biased from the horizontal reference formed by the plane of the horizontal axis of the pick-up device A and the individual position rods 11, and the test platform 10, the rotation of optical disc B driven by motor A2 is not always at horizontal, but is in an up-down swinging position in accordance with the tilted mounting angle of the motor A2. Thus, in view of the sensor 20, the incident wave X emitted by the emitting element 21 remains no change, but the reflected wave Y' by the optical disc B received by the receiving element 22 is different from that of reflected wave Y shown in FIG. 3, and it is a function of time, and is not constant. Similarly, the detected value can be transmitted by the interfacing device 30 to the near-end computer or the far-end computer for determination and recording. Based on the results, it is determined that the mounting quality of the motor A2 is failed, and the operator at the production line can maintain and repair the motor A2 based on the results provided by the interfacing device 30.

While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

What is claimed is:

1. A test device for horizontal position of an optical disc drive, comprising
   (a) a test platform having a plurality of vertical position rods mounted thereon and the rods being of similar horizontal height; and
   (b) at least a sensor mounted within the area formed by the position rods located on the platform, and including at least an emitting element and a receiving element, the emitting element emitting an optical detection signal (i.e., incident wave) to an optical disc connectedly driven by the motor rotating shaft of a pick-up mechanism to be tested, by means of a reflected optical signal produced by the optical disc, the receiving element receives the signal, and the sensor produces a horizontal height measuring data, and thereby the results and the measured horizontal height data determine whether the motor horizontal position of the optical disc drive pick-up device is parallel to the horizontal axial direction of the optical disc drive pick-up device.

2. A test device for horizontal position of an optical disc drive as set forth in claim 1, wherein at least an interfacing device is provided to the test platform to transmit the horizontal height data detected by the sensor to the near-end computer and the far-end computer for determination and recording.

3. A test device for horizontal position of an optical disc drive as set forth in claim 1, wherein the end terminal of the respective position rods of the test platform is mounted with at least a protruded block for the securing of the four corners of the optical disc drive pick-up device.

4. A test device for horizontal position of an optical disc drive as set forth in claim 1, wherein the sensor is a laser optical signal-sensing element.

5. A test device for horizontal position of an optical disc drive as set forth in claim 1, wherein the sensor is an infrared optical signal-sensing element.

* * * * *